US012726092B2

(12) United States Patent
Narahara et al.

(10) Patent No.: US 12,726,092 B2
(45) Date of Patent: Sep. 1, 2026

(54) MANUFACTURING DEVICE AND MANUFACTURING METHOD FOR LAMINATED CORE

(71) Applicant: Mazda Motor Corporation, Aki-gun (JP)

(72) Inventors: Kaito Narahara, Aki-gun (JP); Soichiro Ikeda, Aki-gun (JP); Shintaro Baba, Aki-gun (JP); Shigehiro Furuya, Aki-gun (JP); Kenji Matsuki, Aki-gun (JP); Taku Hyodo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 45 days.

(21) Appl. No.: 19/051,572

(22) Filed: Feb. 12, 2025

(65) Prior Publication Data

US 2025/0300534 A1 Sep. 25, 2025

(30) Foreign Application Priority Data

Mar. 19, 2024 (JP) ................................ 2024-044052

(51) Int. Cl.
*H02K 15/121* (2025.01)
*H02K 15/035* (2025.01)
*H02K 15/40* (2025.01)

(52) U.S. Cl.
CPC ......... *H02K 15/121* (2025.01); *H02K 15/035* (2025.01); *H02K 15/40* (2025.01); *H02K 2215/00* (2021.08)

(58) Field of Classification Search
CPC .... H02K 15/121; H02K 15/035; H02K 15/40; H02K 2215/00; H02K 1/276; H02K 15/03; H02K 15/12; H02K 15/02
See application file for complete search history.

(56) References Cited

U.S. PATENT DOCUMENTS

2012/0305180 A1* 12/2012 Matsubayashi ... B29C 45/14778 156/293
2014/0103574 A1* 4/2014 Ishimatsu ................ H02K 1/28 264/261
2015/0026966 A1* 1/2015 Fang ...................... H02K 15/03 29/598

FOREIGN PATENT DOCUMENTS

JP 5985707 B2 8/2016

* cited by examiner

*Primary Examiner* — Nahida Sultana
(74) *Attorney, Agent, or Firm* — Alleman Hall LLP

(57) ABSTRACT

A manufacturing device includes: an upper plate on which a plunger is mounted; a lower plate arranged under the upper plate; and a tray placed on it, on which a laminated core body is mounted. The tray includes: a cylindrical section inserted in a shaft hole of the laminated core body; and a brim section contacting the lower plate from above and an outer portion of the laminated core body from below. The cylindrical section has a resin arrangement hole in which a resin tablet is arranged and the plunger for pressing it is inserted. The brim section has: a plurality of resin flow path grooves extending radially from the arrangement hole on a lower surface opposing the lower plate; and a plurality of gates, each of which extends upward from each of the plurality of flow path grooves and communicates with each of a plurality of magnet insertion holes.

6 Claims, 11 Drawing Sheets

<STEP S1>

<STEP S2>

MANUFACTURING DEVICE AND MANUFACTURING METHOD FOR LAMINATED CORE

TECHNICAL FIELD

The present invention relates to a manufacturing device and a manufacturing method for a laminated core used for a rotor of an electric motor.

BACKGROUND ART

A laminated core used for a rotor of an electric motor includes: a laminated core body that has a plurality of magnet insertion holes provided at intervals in a circumferential direction; and a plurality of magnet pieces that are fixed in each of the plurality of magnet insertion holes by resin. A technique for manufacturing such a laminated core is disclosed in JP5985707B, for example.

In the technique disclosed in JP5985707B, the laminated core body, in which the magnet pieces are inserted in each of the magnet insertion holes, is arranged between an upper mold and a lower mold, and each of the magnet insertion holes is filled with the resin through a resin flow path that is formed in a guide member from a resin reservoir provided in the upper mold. When the resin that has filled each of the magnet insertion holes is thermally cured, the magnet pieces are fixed in each of the magnet insertion holes.

SUMMARY OF INVENTION

Technical Problem

In the technique disclosed in JP5985707B, when each of the magnet insertion holes is filled with the resin, the resin in a molten state flows through the upper mold and the guide member. In this case, wear caused by the flow of the resin in the molten state, may occur in each of the upper mold and the guide member. This increases the frequency of necessary maintenance for each of the upper mold and the guide member. In addition, after the resin that has filled each of the magnet insertion holes is cured, a cured resin product remains in each of the upper mold and the guide member. In this case, it is necessary to perform work to remove the cured resin product from each of the upper mold and the guide member. Just as described, since the frequency in maintenance for each of the upper mold and the guide member is increased, and it is necessary to perform the work to remove the cured resin product, there is a problem of reduced efficiency in manufacturing the laminated core.

An object of the invention is to provide a manufacturing device and a manufacturing method capable of efficiently manufacturing a laminated core.

Solution to Problem

A manufacturing device for a laminated core according to an aspect of the invention is a device for manufacturing the laminated core that includes: a laminated core body that has a shaft hole at a center and has a plurality of magnet insertion holes provided at intervals in a circumferential direction in an outer circumferential portion surrounding the shaft hole; and a plurality of magnet pieces, each magnet piece being fixed by resin and inserted in a respective one of the plurality of magnet insertion holes. This manufacturing device includes: an upper plate on which a vertically movable plunger is mounted; a lower plate arranged under the upper plate; and a tray, on which the laminated core body with the magnet pieces inserted in a respective magnet insertion holes is mounted, and which is placed on the lower plate. The upper plate comes into contact with the laminated core body, which is mounted on the tray on the lower plate, from above. The tray includes: a cylindrical section that has a resin arrangement hole and is inserted in the shaft hole of the laminated core body, the resin arrangement hole being a hole extending vertically, a resin tablet as a molded body of the resin being arranged therein, and the plunger for pressing the resin tablet being inserted therein; and a brim section that protrudes radially outward from a lower end of the cylindrical section, comes into contact with the lower plate from above, and comes into contact with the outer circumferential portion of the laminated core body from below, the brim section having: a plurality of resin flow path grooves, each of which extends radially from the resin arrangement hole in a lower surface opposing the lower plate; and a plurality of gates, each of which extends upward from a tip of a respective one of the plurality of resin flow path grooves and communicates with a respective one of the plurality of magnet insertion holes.

According to this manufacturing device for the laminated core, the laminated core body is mounted on the tray that includes: the cylindrical section having the resin arrangement hole; and the brim section having the plurality of resin flow path grooves and the plurality of gates. The tray, on which the laminated core body is mounted, is placed on the lower plate, and the resin tablet is arranged in the resin arrangement hole of the tray. In the state where the upper plate is in contact with the laminated core body from above, the plunger presses the resin tablet in the resin arrangement hole. In this way, the resin that is extruded from the resin arrangement hole can fill each of the magnet insertion holes through the respective resin flow path groove and the respective gate of the tray. In such a manufacturing device, the tray is provided with: the resin arrangement hole in which the resin tablet is arranged; and each of the resin flow path grooves and each of the gates that connect between the resin arrangement hole and the respective magnet insertion hole. In this case, only the tray potentially requires maintenance related to wear caused by the flow of the resin that has filled each of the magnet insertion holes. In addition, the resin only remains in the tray after the resin fills each of the magnet insertion holes. For this reason, only the tray potentially requires the maintenance and removal work of the residual resin. As a result, it is possible to efficiently perform the maintenance and the removal work of the residual resin, and it is thus possible to efficiently manufacture the laminated core.

In the manufacturing device for the laminated core, the resin arrangement hole extends along a center axis of the cylindrical section. The plurality of resin flow path grooves extend substantially for a same length from the resin arrangement hole.

In this aspect, the resin arrangement hole, in which the resin tablet is arranged, is located on the center axis of the cylindrical section, and the resin flow path grooves, which extend radially from the resin arrangement hole, have substantially the same length. In this case, a required filling time until each of the magnet insertion holes is filled with the resin, which has been extruded from the resin arrangement hole by the plunger pressing the resin tablet and flows through the respective resin flow path groove and the respective gate, can be made substantially the same among the magnet insertion holes. That is, the plurality of magnet insertion holes can be filled with the resin substantially at the same time.

In the manufacturing device for the laminated core, the tray may be a conveyance tray that is conveyed by the lower plate in a state where the laminated core body is mounted on the tray.

In this aspect, since the tray is conveyed with respect to the lower plate, the tray, on which the laminated core body is mounted, can be placed on the lower plate.

In the manufacturing device for the laminated core, the resin may be a thermosetting resin, and the upper plate and the lower plate may each have a heating section capable of increasing a temperature of the thermosetting resin to a temperature at which the thermosetting resin is thermally cured.

The thermosetting resin is temporarily brought into a molten state having fluidity at the thermosetting temperature. However, after being cured by a polymerization reaction for a predetermined time, the thermosetting resin remains in a cured state. By using such properties of the thermosetting resin in the manufacturing device, each of the magnet insertion holes of the laminated core body is filled with the resin in the molten state, the resin is thermally cured in each of the magnet insertion holes, and the magnet pieces are thereby fixed. At this time, the heating section of the upper plate can heat the plunger, which is mounted on the upper plate; the laminated core body, in contact with the upper plate; and the tray to the thermosetting temperature from above. In addition, the heating section of the lower plate can heat the tray, which is placed on the lower plate, to the thermosetting temperature from below. In this way, it is possible to keep the resin flow path, which runs from the resin arrangement hole of the tray to the magnet insertion holes of the laminated core body through the resin flow path grooves and the gates, at the thermosetting temperature. Accordingly, each of the magnet insertion holes can be filled with the resin, which has been extruded from the resin arrangement hole by pressing of the resin tablet by the plunger, with the resin in the molten state and exhibiting fluidity, causing the resin to flow through the respective resin flow path groove and the respective gate. Furthermore, the resin can be thermally cured in each of the magnet insertion holes.

A manufacturing method for a laminated core according to another aspect of the invention is a method for manufacturing the laminated core including: a laminated core body that has a shaft hole at a center and has a plurality of magnet insertion holes provided at intervals in a circumferential direction in an outer circumferential portion surrounding the shaft hole; and a plurality of magnet pieces, each of the magnet pieces being fixed by resin and inserted in a respective one of the plurality of magnet insertion holes. This manufacturing method includes: preparing a tray that includes a cylindrical section having a resin arrangement hole extending vertically and a brim section protruding radially outward from a lower end of the cylindrical section and in which the brim section is formed with a plurality of resin flow path grooves extending radially from the resin arrangement hole and a plurality of gates, each of which extends upward from a tip of a respective one of the plurality of resin flow path grooves; mounting the laminated core body on the tray by inserting the cylindrical section in the shaft hole and bringing the brim section into contact with the outer circumferential portion from below, and thereafter inserting the magnet piece in a respective one of the plurality of magnet insertion holes; placing the tray, on which the laminated core body is mounted, on a lower plate arranged under an upper plate, on which a vertically movable plunger is mounted, and arranging a resin tablet, which is a molded body of the resin, in the resin arrangement hole; and bringing the upper plate into contact with the laminated core body, which is mounted on the tray on the lower plate, from above in a state where the plunger is inserted in the resin arrangement hole, and thereafter filling the plurality of magnet insertion holes with the resin, which is extruded from the resin arrangement hole by lowering the plunger and pressing the resin tablet, through the plurality of resin flow path grooves and the plurality of gates.

According to this manufacturing method for the laminated core, the laminated core body is mounted on the tray that includes: the cylindrical section having the resin arrangement hole; and the brim section having the resin flow path grooves and the gates. The tray, on which the laminated core body is mounted, is placed on the lower plate, and the resin tablet is arranged in the resin arrangement hole of the tray. Then, the plunger is inserted in the resin arrangement hole. In this way, the tray can be accurately positioned with respect to the plunger by positioning a center of the resin arrangement hole on a center axis of the plunger. Next, the upper plate is brought into contact with the laminated core body, which is mounted on the tray on the lower plate, from above. Thereafter, the plunger is lowered to press the resin tablet in the resin arrangement hole. In this way, each of the magnet insertion holes can be filled with the resin, which has been extruded from the resin arrangement hole, through the respective resin flow path groove and the respective gate of the tray.

In the manufacturing method for the laminated core, the resin is a thermosetting resin. The manufacturing method further includes: lifting the plunger until the resin, which has filled the plurality of magnet insertion holes, exits the resin arrangement hole after the resin is thermally cured, canceling contact between the upper plate and the laminated core body, and thereafter separating the laminated core body from the tray.

In the state where the tray is placed on the lower plate and the upper plate is in contact with the laminated core body mounted on the tray, the resin, which has filled each of the magnet insertion holes of the laminated core body, is in contact with the upper plate, and the resin in each of the resin flow path grooves of the tray is in contact with the lower plate. In this case, a contact area of the resin with the lower plate is larger than a contact area of the resin with the upper plate. Accordingly, after the resin, which has filled each of the magnet insertion holes, is thermally cured, the contact between the upper plate and the laminated core body is released. At this time, the tray, on which the laminated core body is mounted, remains placed on the lower plate, and the resin, which has been cured in each of the magnet insertion holes, is separated from the upper plate. In this way, it is possible to prevent cured product of the resin from remaining on the upper plate.

After the contact between the upper plate and the laminated core body is released, the laminated core body is separated from the tray. When the laminated core body is separated from the tray, the resin, which has been cured in each of the magnet insertion holes, is broken in a portion of the respective gate of the tray. In this case, the cured product of the resin remains in each of the resin flow path grooves and each of the gates of the tray. Thus, it is only necessary to perform work to remove the cured product of the resin from the tray.

Advantageous Effects of Invention

As it has been described so far, aspects of the invention can provide a manufacturing device and a manufacturing method capable of efficiently manufacturing a laminated core.

DESCRIPTION OF EMBODIMENTS

Hereinafter, a description will be made on a manufacturing device and a manufacturing method for a laminated core according to an embodiment of the invention with reference to the drawings.

[Manufacturing Device of Laminated Core]

Figure 1:
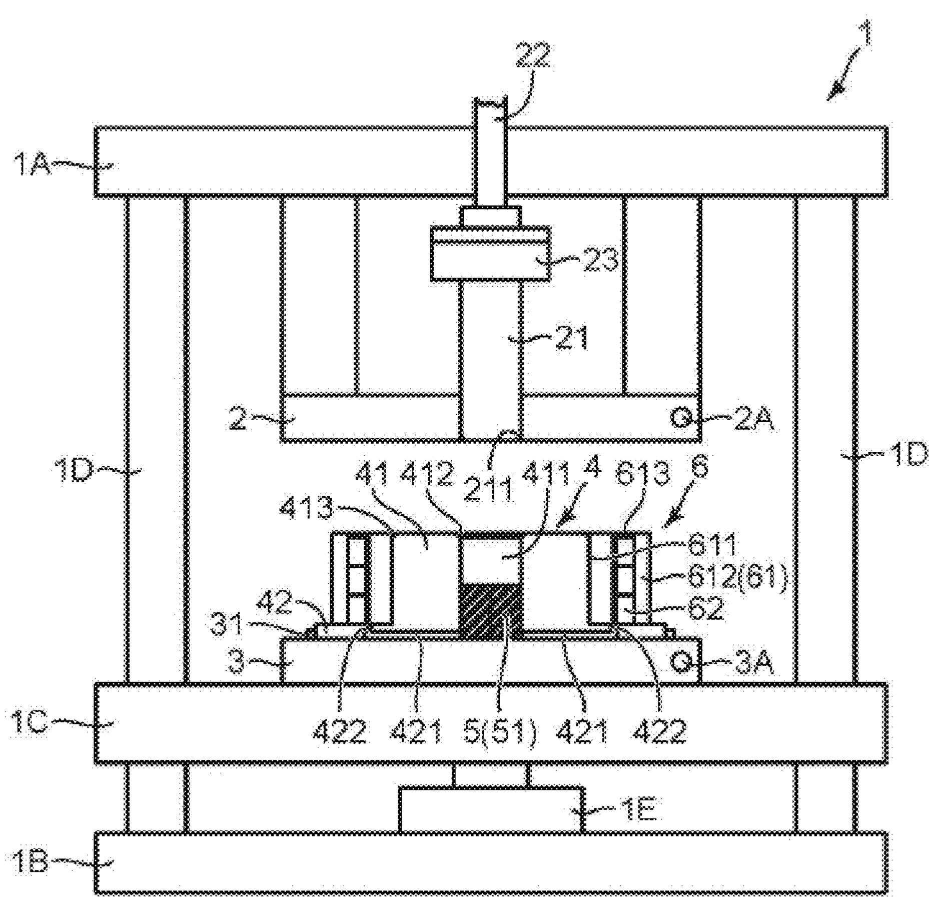
FIG. 1 is a view schematically illustrating a manufacturing device of a laminated core according to an embodiment of the invention.

FIG. 1 is a view schematically illustrating a manufacturing device 1 of the laminated core according to the embodiment of the invention. The manufacturing device 1 is a device that manufactures a laminated core 6 used for a rotor of an electric motor.

Figure 2:
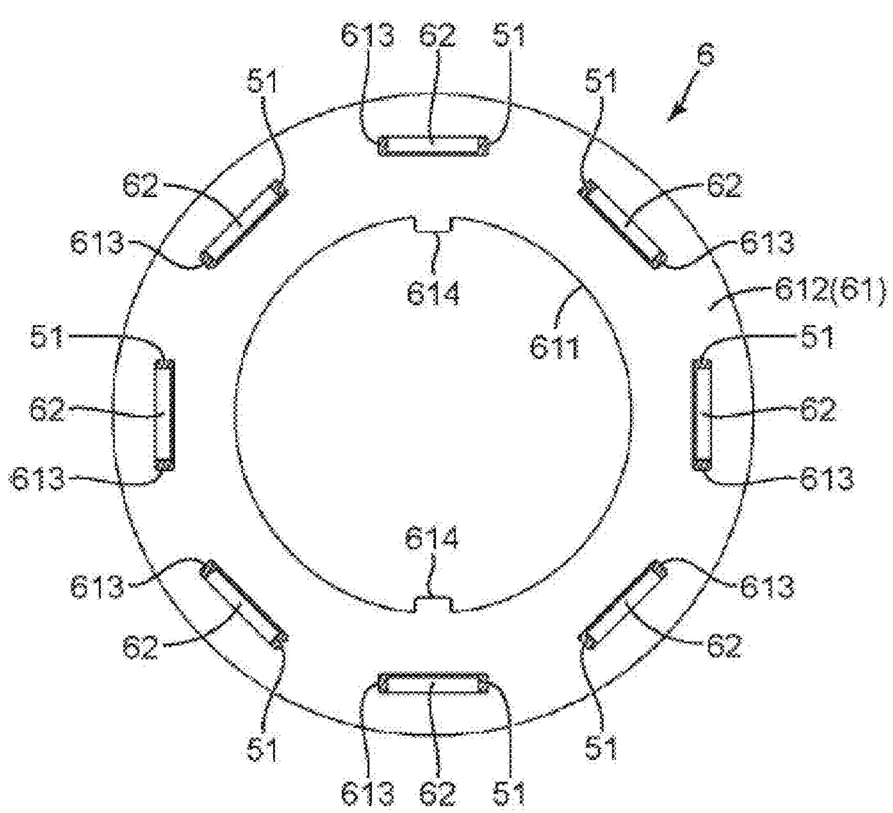
FIG. 2 is a plan view of the laminated core that is manufactured by the manufacturing device.

The laminated core 6, which is manufactured by the manufacturing device 1, has a laminated structure in which a plurality of annular steel plates having an insulating film are laminated. The laminated core 6 will be described with reference to FIG. 2. The laminated core 6 includes: a laminated core body 61 having an annular shape; and a plurality of magnet pieces 62. The laminated core body 61 has: a shaft hole 611 at a center thereof; and a plurality of magnet insertion holes 613 that are provided at equally-spaced intervals in a circumferential direction in an outer circumferential portion 612 surrounding the shaft hole 611. In the example illustrated of FIG. 2, the laminated core body 61 has eight magnet insertion holes 613 that are provided at equally-spaced intervals in the circumferential direction in the outer circumferential portion 612. In addition, the laminated core body 61 has rotation positioning keys 614, each of which protrudes radially inward from a hole edge of the shaft hole 611. The magnet pieces 62 are permanent magnets and are fixed by resin 51 in a state where the magnet pieces 62 are respectively inserted in each of the plurality of magnet insertion holes 613.

With reference back to FIG. 1, the manufacturing device 1 fills each of the magnet insertion holes 613 of the laminated core body 61 with the resin 51, fixes the magnet pieces 62 with the resin 51 in each of the magnet insertion holes 613, and thereby manufactures the laminated core 6. Examples of the resin 51 include thermosetting resins such as a phenol resin, an epoxy resin, an unsaturated polyester resin, and polyurethane. The resin 51, which can be a thermosetting resin, is temporarily brought into a molten state having fluidity under a thermosetting temperature of about 170° C., for example, but remains in a cured state after being cured by a polymerization reaction for a predetermined time. The manufacturing device 1 fills each of the magnet insertion holes 613 of the laminated core body 61 with the resin 51 in the molten state, thermally cures the resin 51 in each of the magnet insertion holes 613, and thereby fixes the magnet pieces 62 in the magnet insertion holes 613.

The manufacturing device 1 includes an upper frame 1A and a lower frame 1B that are arranged to oppose each other in a vertical direction, a lifting plate 1C, guide posts 1D, and a lifting unit 1E. The upper frame 1A constitutes an upper surface portion of the manufacturing device 1, and the lower frame 1B constitutes a lower surface portion of the manufacturing device 1. The upper frame 1A and the lower frame 1B are connected by the plurality of guide posts 1D, each of which extends in the vertical direction. The lifting plate 1C has a flat plate shape and is supported in a vertically movable manner by the plurality of guide posts 1D. The lifting plate 1C is supported by the plurality of guide posts 1D while keeping a horizontal position. At a position under the lifting plate 1C, the lifting unit 1E is installed on the lower frame 1B. The lifting unit 1E moves the lifting plate 1C vertically along the guide posts 1D by driving a servo motor or the like.

Furthermore, the manufacturing device 1 includes: an upper plate 2 that includes a plunger 21; a lower plate 3 that is arranged under the upper plate 2; and a tray 4 that is placed on the lower plate 3.

The upper plate 2 has a flat plate shape and is suspended downward from the upper frame 1A while keeping a horizontal orientation in a manner to be located between the upper frame 1A and the lifting plate 1C. The upper plate 2 has a heating section 2A capable of increasing a temperature to the thermosetting temperature of the resin 51, which is made of the thermosetting resin. The upper plate 2 is heated to the thermosetting temperature of about 170° C., for example, by the heating section 2A.

The plunger 21 has a columnar shape, for example, and is mounted on the upper plate 2 in a vertically movable manner while keeping a vertically extending orientation. In the present embodiment, the single plunger 21 is mounted on the upper plate 2. The plunger 21 is connected to a push rod 22 via a holder 23. The plunger 21 moves vertically along with the vertical movement of the push rod 22 which is generated by a drive device (not illustrated) such as the servo motor. In addition, the plunger 21 has a chamfered section 211, a lower end of which is chamfered.

The lower plate 3 has a flat plate shape, and is fixed onto an upper surface of the lifting plate 1C while keeping a horizontal orientation. The lower plate 3 moves vertically with respect to the upper plate 2 along with the vertical movement of the lifting plate 1C. The lower plate 3 has a heating section 3A capable of increasing the temperature to the thermosetting temperature of the resin 51, made of the thermosetting resin. The lower plate 3 is heated to the thermosetting temperature of about 170° C., for example, by the heating section 3A. In addition, the lower plate 3 has a tray guide 31 on an upper surface thereof, and the tray guide 31 guides the placement of the tray 4.

The laminated core body 61 is mounted on the tray 4 while each of the magnet pieces 62 is inserted in each of the magnet insertion holes 613. In the mounted state of the laminated core body 61, the tray 4 is placed on the lower plate 3 with the tray guide 31 as a guide. In this embodiment, the tray 4 is a conveyance tray that is conveyed by the lower plate 3 in a state where the laminated core body 61 is mounted thereon. In this case, since the tray 4 is conveyed with respect to the lower plate 3, the tray 4, on which the laminated core body 61 is mounted, can be placed on the lower plate 3.

A detailed description will be made on the tray 4 with reference to FIGS. 3 and 4 in addition to FIG. 1. The tray 4 includes: a cylindrical section 41 that has a cylindrical shape; and a flat plate-shaped brim section 42 that protrudes radially outward from a lower end of the cylindrical section 41. In the tray 4, the cylindrical section 41 and the brim section 42 may be integrated or separated. In this embodiment, the cylindrical section 41 and the brim section 42 are provided independently of each other. In this case, the brim section 42 is detachably attached to the cylindrical section 41 by using a fastener such as a bolt.

The cylindrical section 41 has a resin arrangement hole 411 that extends vertically, and is inserted in the shaft hole 611 of the laminated core body 61. The resin arrangement hole 411 is a hole that penetrates the cylindrical section 41 vertically and that has a circular shape when seen in the vertical direction. A resin tablet 5 as a molded body of the resin 51 is arranged in the resin arrangement hole 411, and the plunger 21 that presses the resin tablet 5 is inserted in the resin arrangement hole 411 from above. The cylindrical section 41 has a first chamfered section 412 that is formed by chamfering an upper hole edge of the resin arrangement hole 411. This improves ease of insertion of the plunger 21 into the resin arrangement hole 411 from above. In addition, the cylindrical section 41 has a second chamfered section 413 that is formed by chamfering an upper end thereof. This improves the ease of insertion of the cylindrical section 41 into the shaft hole 611 of the laminated core body 61. Furthermore, the cylindrical section 41 has key grooves 414 in an outer circumferential surface thereof. Each of the rotation positioning keys 614 of the laminated core body 61 can be engaged with the respective key groove 414. In the state where each of the rotation positioning keys 614 is engaged with the respective key groove 414, the cylindrical section 41 is inserted in the shaft hole 611 of the laminated core body 61.

In the state where the tray 4 is placed on the lower plate 3, the brim section 42 is in contact with the lower plate 3 from above. In addition, in the state where the cylindrical section 41 is inserted in the shaft hole 611 of the laminated core body 61, the brim section 42 is in contact with the outer circumferential portion 612 from below. The brim section 42 has a plurality of resin flow path grooves 421 and a plurality of gates 422. Each of the resin flow path grooves 421 is a groove that is formed in a lower surface of the brim section 42 facing the lower plate 3 and is opened downward. Each of the resin flow path grooves 421 has a shape that extends radially from a lower end of the resin arrangement hole 411. Each of the resin flow path grooves 421 forms a flow path, through which the resin 51 in the molten state with the fluidity flows, between the brim section 42 and the lower plate 3. Each of the gates 422 extends upward from a tip of each of the resin flow path grooves 421 on an opposite side of the resin arrangement hole 411, and communicates with the respective magnet insertion hole 613. Each of the gates 422 forms a flow path for guiding the resin 51 in the respective resin flow path groove 421 to the respective magnet insertion hole 613. Each of the gates 422 communicates with a radially inner region of the respective magnet insertion hole 613.

In a state where the cylindrical section 41 is inserted in the shaft hole 611 and the brim section 42 is in contact with the outer circumferential portion 612 from below, the laminated core body 61 is mounted on the tray 4.

In the manufacturing device 1 that has been described so far, the laminated core body 61 is mounted on the tray 4 that includes: the cylindrical section 41 having the resin arrangement hole 411; and the brim section 42 having the plurality of resin flow path grooves 421 and the plurality of gates 422. The tray 4, on which the laminated core body 61 is mounted, is placed on the lower plate 3, and the resin tablet 5 is arranged in the resin arrangement hole 411 of the tray 4.

When the lower plate 3 moves upward along with upward movement of the lifting plate 1C, the upper plate 2 comes into contact with the laminated core body 61, which is mounted on the tray 4 on the lower plate 3, from above. In the state where the upper plate 2 is in contact with the laminated core body 61 from above, just as described, the plunger 21 presses the resin tablet 5 in the resin arrangement hole 411 from above while being lowered. In this way, the resin 51 that is extruded from the resin arrangement hole 411 can fill each of the magnet insertion holes 613 through the respective resin flow path groove 421 and the respective gate 422 of the tray 4. At this time, each of the gates 422 communicates with the radially inner region of the respective magnet insertion hole 613. In this case, since the resin 51 fills each of the magnet insertion holes 613 from the radially inner regions, the magnet pieces 62 can be fixed to a radially outer region in each of the magnet insertion holes 613.

As described above, the resin 51, which is made of the thermosetting resin, is temporarily brought into the molten state having the fluidity under the thermosetting temperature. However, after being cured by the polymerization reaction for the predetermined time, the resin 51 remains in the cured state. By using such properties of the thermosetting resin, in the manufacturing device 1, each of the magnet insertion holes 613 of the laminated core body 61 is filled with the resin 51 in the molten state, the resin 51 is thermally cured in each of the magnet insertion holes 613, and the magnet pieces 62 is thereby fixed. At this time, the heating section 2A of the upper plate 2 can heat the plunger 21 which is mounted on the upper plate 2, the laminated core body 61 in contact with the upper plate 2, and the tray 4 to the thermosetting temperature from above. In addition, the heating section 3A of the lower plate 3 can heat the tray 4, which is placed on the lower plate 3, to the thermosetting temperature from below. In this way, it is possible to keep the resin flow path, which runs from the resin arrangement hole 411 of the tray 4 to the magnet insertion holes 613 of the laminated core body 61 through the resin flow path grooves 421 and the gates 422, at the thermosetting temperature. Accordingly, each of the magnet insertion holes 613 can be filled with the resin 51, which, by the plunger 21 pressing the resin tablet 5 in the molten state exhibiting fluidity, has been extruded from the resin arrangement hole 411, through the respective resin flow path groove 421 and the respective gate 422. Furthermore, the resin 51 is thermally cured in each of the magnet insertion holes 613 and can thereby fix each magnet piece 62 in a respective magnet insertion hole 613.

Here, the upper plate 2 may be formed with a groove for releasing gas or the like, which is produced by the polymerization reaction at the time of thermally curing the resin 51.

Figure 3:
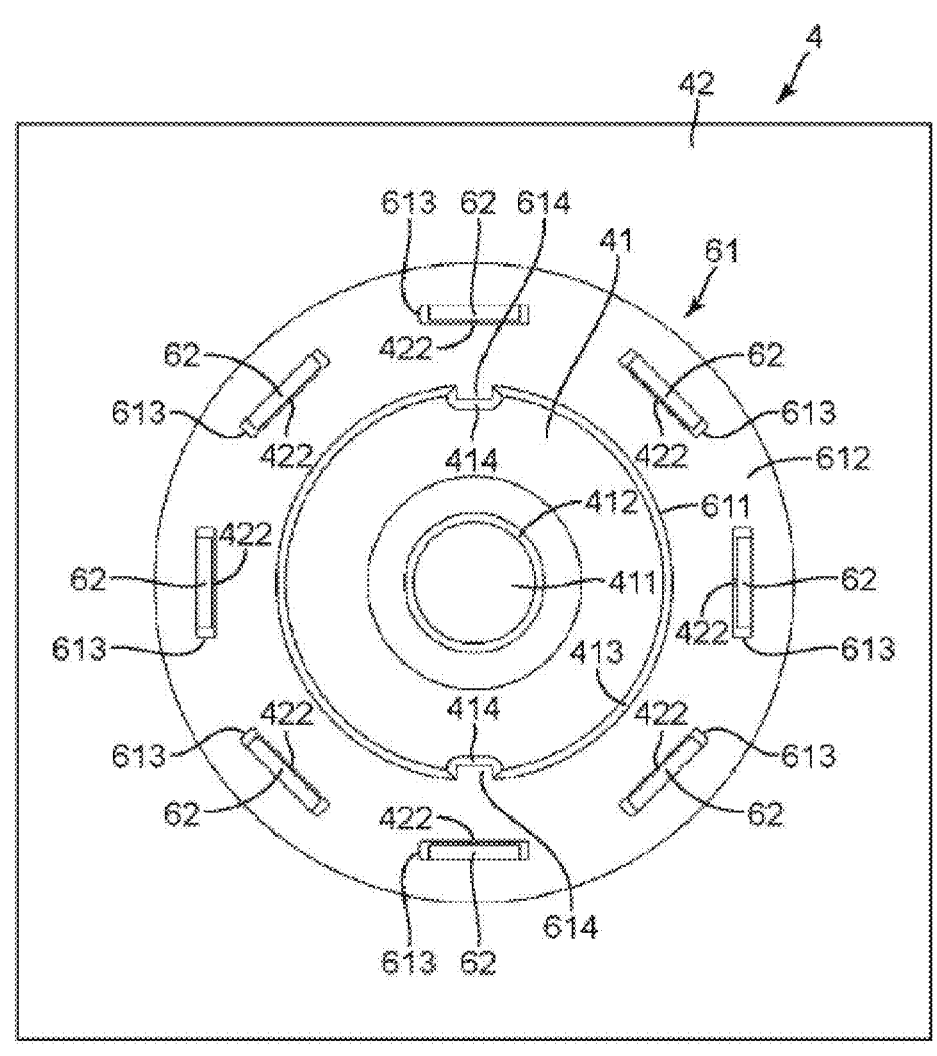
FIG. 3 is a view in which a tray on which a laminated core body is mounted is seen from above.
Figure 4:
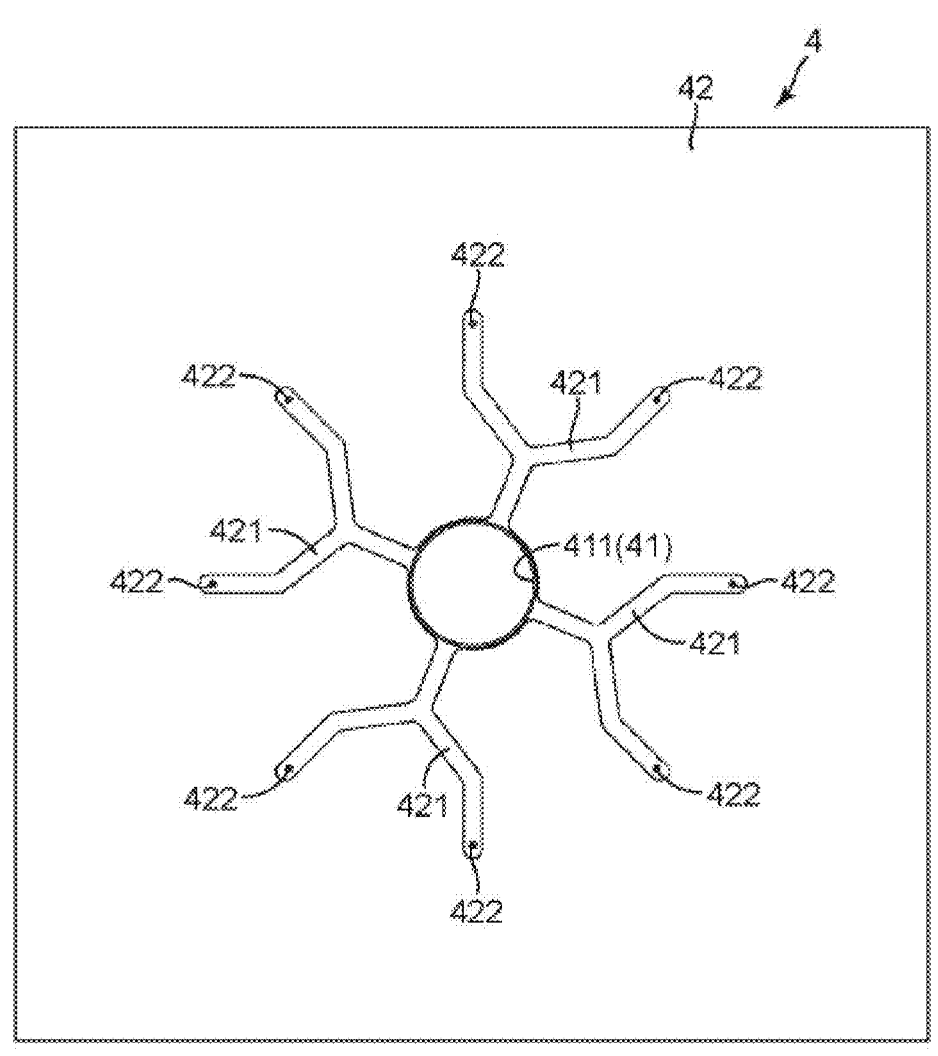
FIG. 4 is a view in which the tray is seen from below.

As illustrated in FIGS. 3 and 4, in the manufacturing device 1 according to this embodiment, the resin arrangement hole 411 in the tray 4 extends along a center axis of the cylindrical section 41. In addition, the plurality of resin flow path grooves 421 extend substantially for a same length from the resin arrangement hole 411. In this case, the resin arrangement hole 411, in which the resin tablet 5 is arranged, is located on the center axis of the cylindrical section 41, and the resin flow path grooves 421, which extend radially from the resin arrangement hole 411, have substantially the same length. In this case, a required filling time until each of the magnet insertion holes 613 is filled with the resin 51, which has been extruded from the resin arrangement hole 411 by the plunger 21 pressing the resin tablet 5, through the respective resin flow path groove 421 and the respective gate 422, can be made substantially the same among the magnet insertion holes 613. That is, the plurality of magnet insertion holes 613 can be filled with the resin 51 substantially at the same time. Furthermore, the resin 51, which has filled each of the magnet insertion holes 613, can be cured substantially at the same time, and the magnet pieces 62 can be fixed in each of the magnet insertion holes 613.

In the manufacturing device 1, after the resin 51, which has filled each of the magnet insertion holes 613, is thermally cured, the lower plate 3 moves downward along with downward movement of the lifting plate 1C. In this way, the upper plate 2 releases its contact with the laminated core body 61, which is mounted on the tray 4 on the lower plate 3.

In the state where the tray 4 is placed on the lower plate 3 and the upper plate 2 is in contact with the laminated core body 61 mounted on the tray 4, the resin 51, which has filled each of the magnet insertion holes 613 of the laminated core body 61, is in contact with the upper plate 2, and the resin 51 in each of the resin flow path grooves 421 of the tray 4 is in contact with the lower plate 3. In this case, a contact area of the resin 51 with the lower plate 3 is larger than a contact area of the resin 51 with the upper plate 2. Accordingly, after the resin 51, which has filled each of the magnet insertion holes 613, is thermally cured, contact between the upper plate 2 with the laminated core body 61 is released. At this time, the tray 4, on which the laminated core body 61 is mounted, remains placed on the lower plate 3, and the resin 51, which has been cured in each of the magnet insertion holes 613, is separated from the upper plate 2. In this way, it is possible to prevent cured product of the resin 51 from remaining on the upper plate 2.

After the contact between the upper plate 2 and the laminated core body 61 is released, the laminated core body 61 is separated from the tray 4. When the laminated core body 61 is separated from the tray 4, the resin 51, which has been cured in each of the magnet insertion holes 613, is broken in a portion of the respective gate 422 of the tray 4. In this case, the cured product of the resin 51 remains in each of the resin flow path grooves 421 and each of the gates 422 of the tray 4. Thus, it is only necessary to perform work to remove the cured product of the resin 51 from the tray 4. At this time, since the cylindrical section 41 and the brim section 42 are provided independently of each other in the tray 4, the brim section 42 can be removed from the cylindrical section 41. In this way, it is possible to efficiently perform the removal work of the cured product of the resin 51 that remains in each of the resin flow path grooves 421 and each of the gates 422 formed in the brim section 42.

In addition, the brim section 42 may have a laminated structure in which a plate body formed with the resin flow path grooves 421 and a plate body formed with the gates 422 are laminated. In this case, it is possible to perform the removal work of the cured product of the resin 51 by separating each of the resin flow path grooves 421 from the respective gate 422.

Furthermore, each of the resin flow path grooves 421 opened downward in the brim section 42 may have a groove shape, a groove width of which is increased downward. In this case, it is possible to efficiently perform the removal work of the cured product of the resin 51 that remains in each of the resin flow path grooves 421.

In the manufacturing device 1 having the above configuration, the tray 4 is provided with: the resin arrangement hole 411 in which the resin tablet 5 is arranged; and each of the resin flow path grooves 421 and each of the gates 422 that connect between the resin arrangement hole 411 and the respective magnet insertion hole 613. In this case, only the tray 4 potentially requires maintenance related to wear caused by the flow of the resin 51 that has filled each of the magnet insertion holes 613. In addition, the resin 51 only remains in the tray 4 after the resin 51 fills each of the magnet insertion holes 613. For this reason, only the tray 4 potentially requires the maintenance and the removal work of the residual resin. As a result, it is possible to efficiently perform the maintenance and the removal work of the residual resin, and it is thus possible to efficiently manufacture the laminated core 6.

In the tray 4, the cylindrical section 41 may have a structure in which a central portion formed with the resin arrangement hole 411 is detachable. In this case, ease of maintenance of the central portion formed with the resin arrangement hole 411, in which the plunger 21 slides, is improved.

[Manufacturing Method for Laminated Core]

Figure 5:
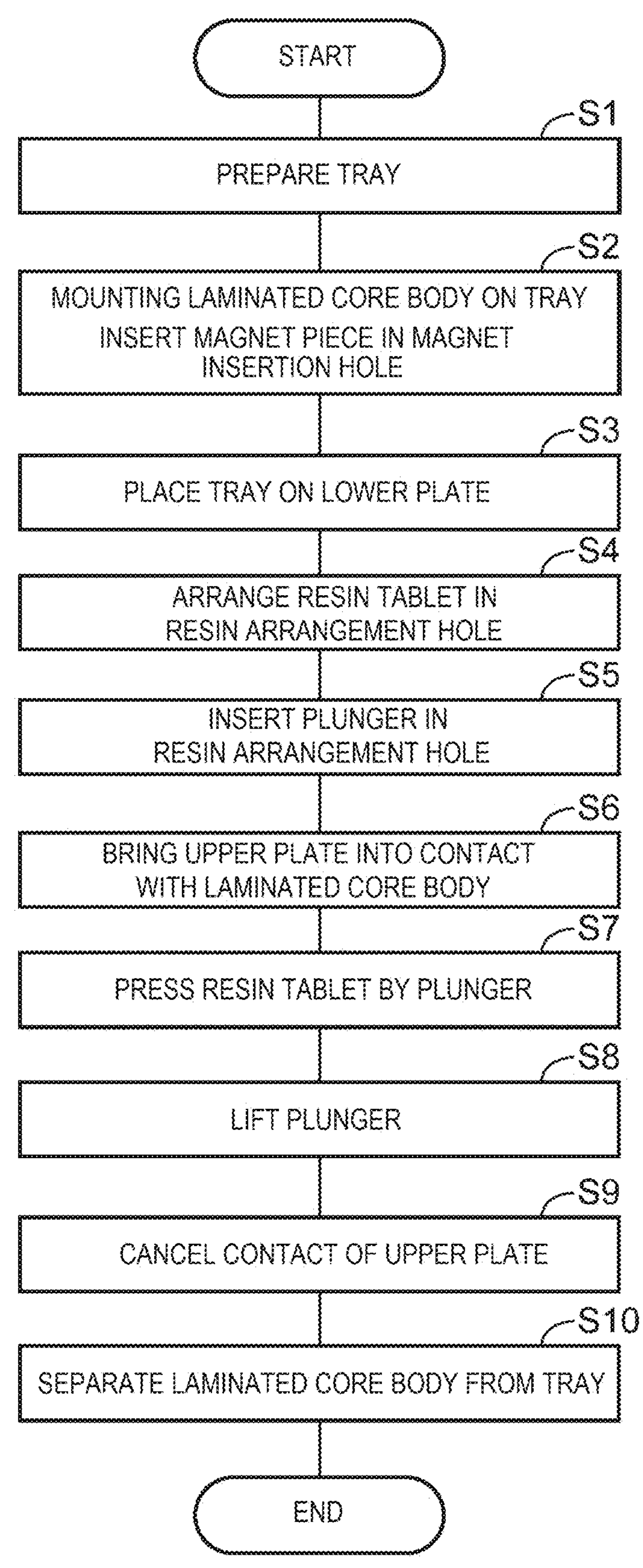
FIG. 5 is a flowchart illustrating a manufacturing method for the laminated core.
Figure 6:
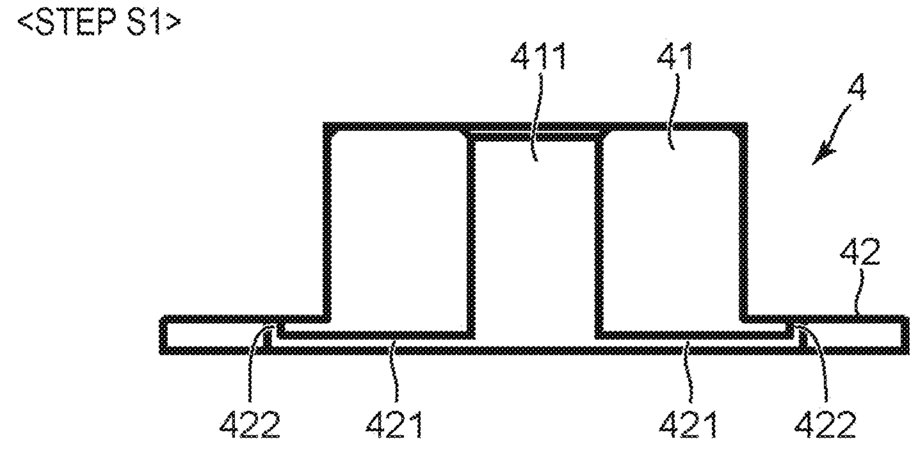
FIG. 6 includes views schematically illustrating processing in step S1 and step S2 of the manufacturing method for the laminated core.
Figure 6:
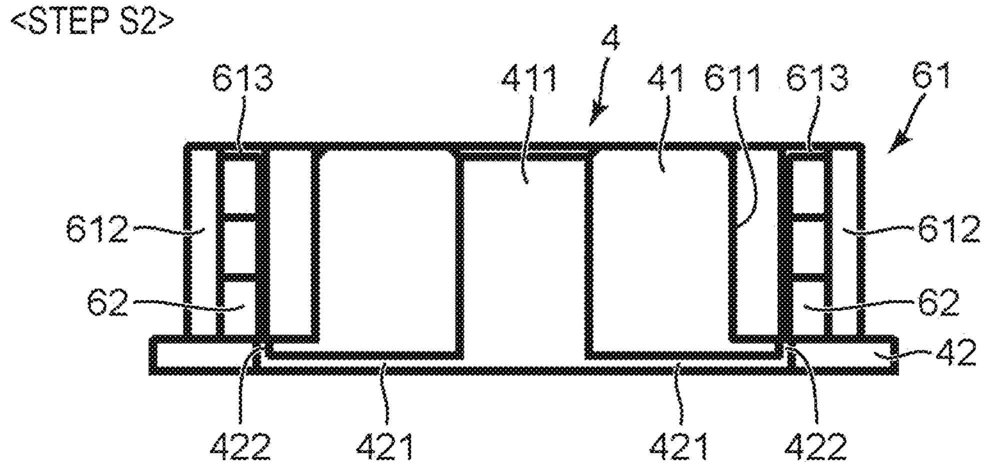
Figure 7:
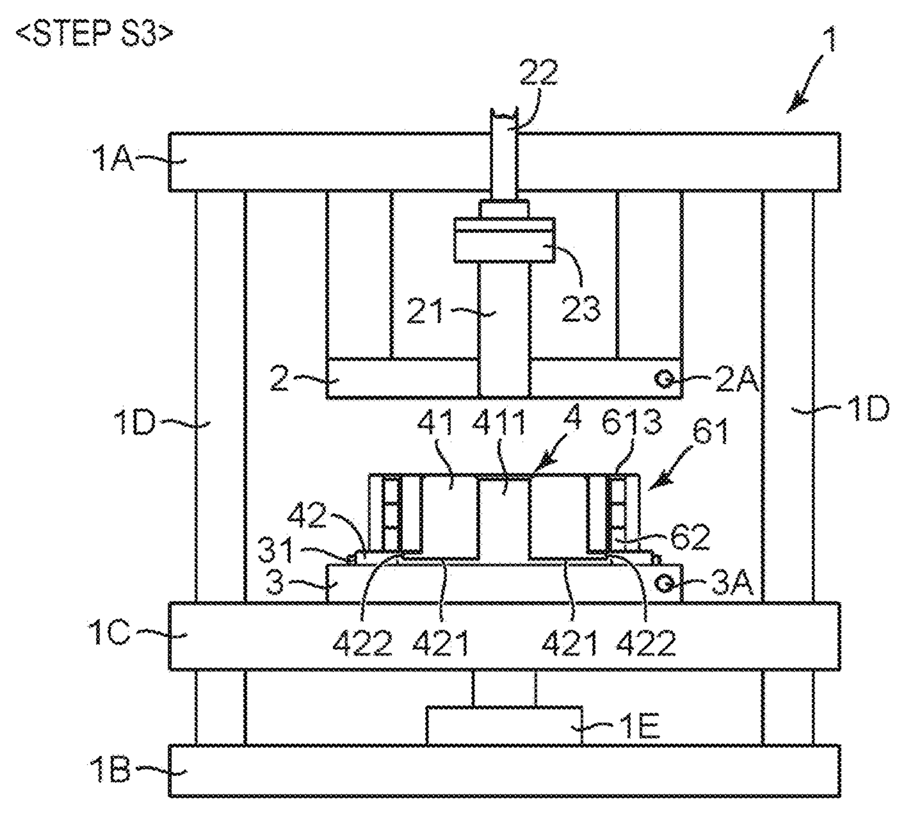
FIG. 7 includes views schematically illustrating processing in step S3 and step S4 of the manufacturing method for the laminated core.
Figure 7:
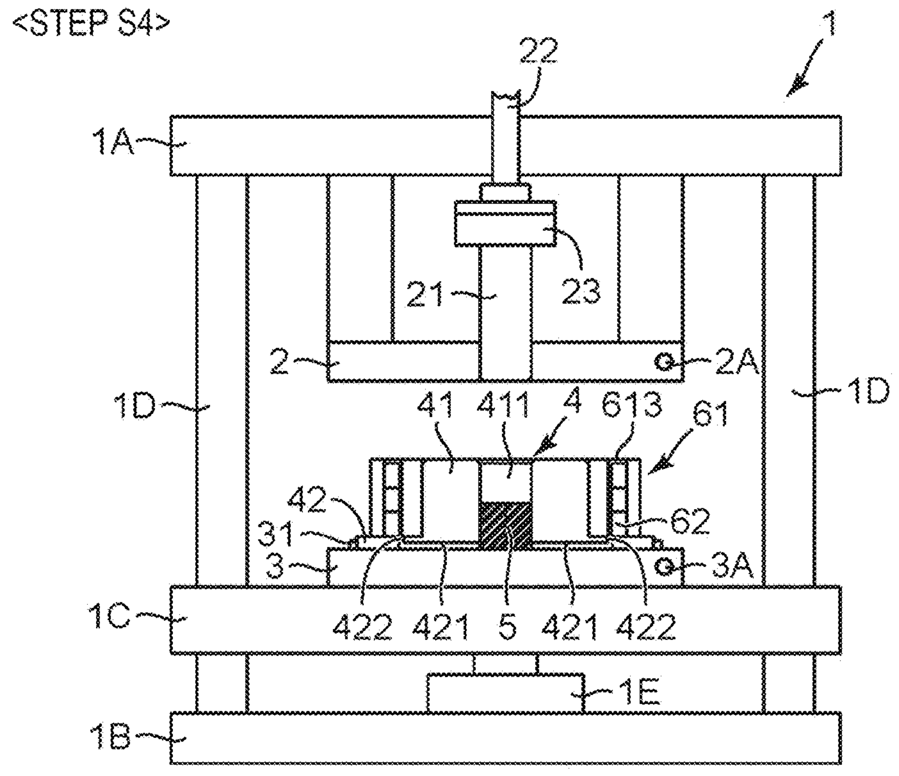
Figure 8:
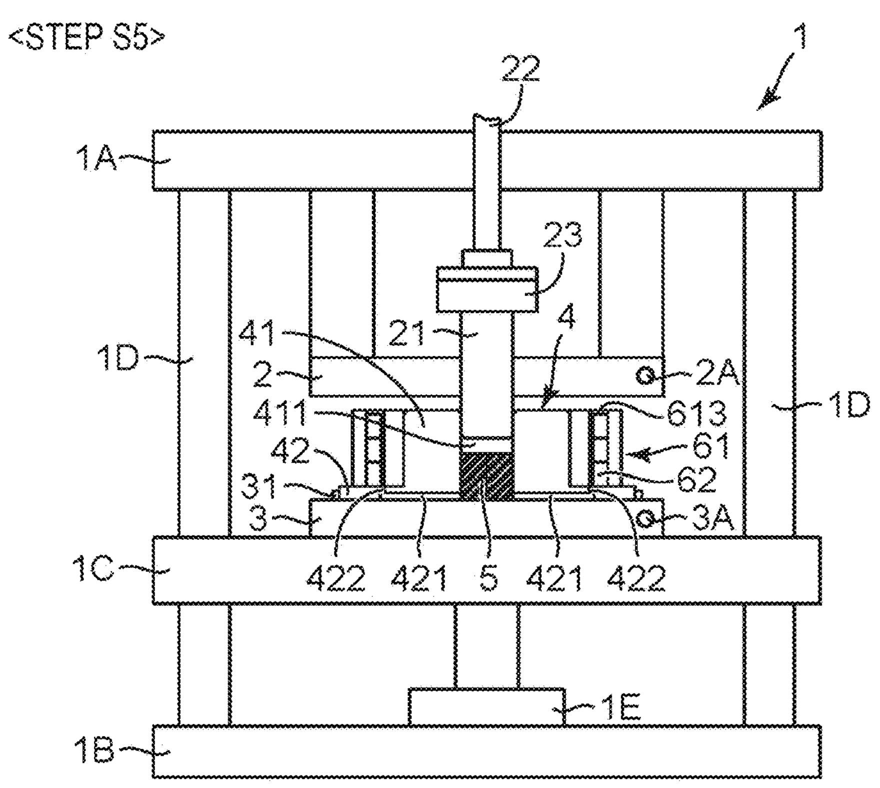
FIG. 8 includes views schematically illustrating processing in step S5 and step S6 of the manufacturing method for the laminated core.
Figure 8:
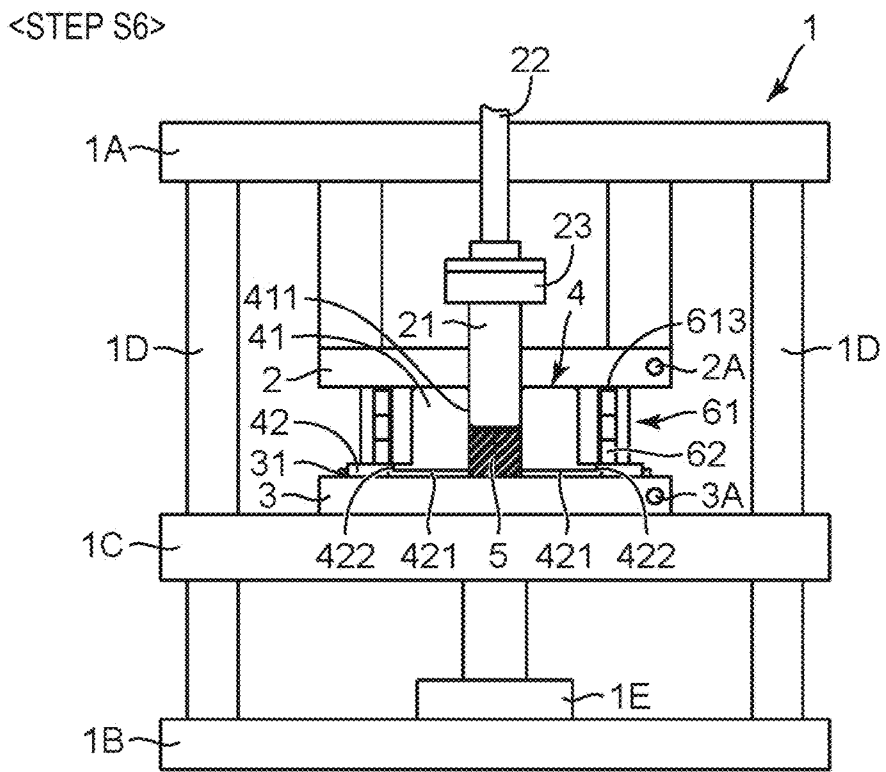
Figure 9:
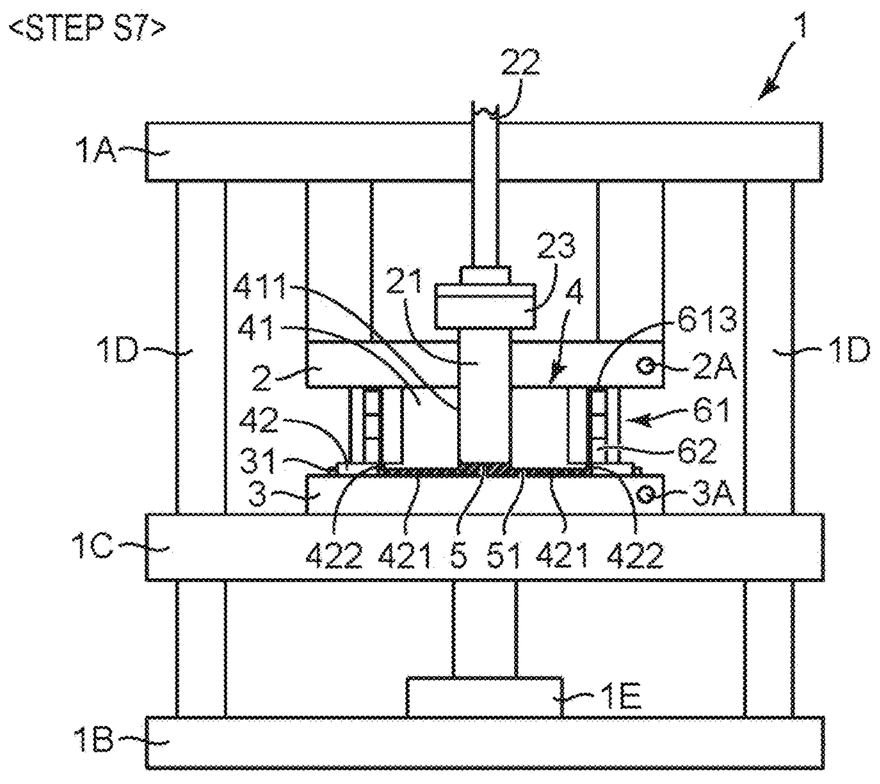
FIG. 9 includes views schematically illustrating processing in step S7 and step S8 of the manufacturing method for the laminated core.
Figure 9:
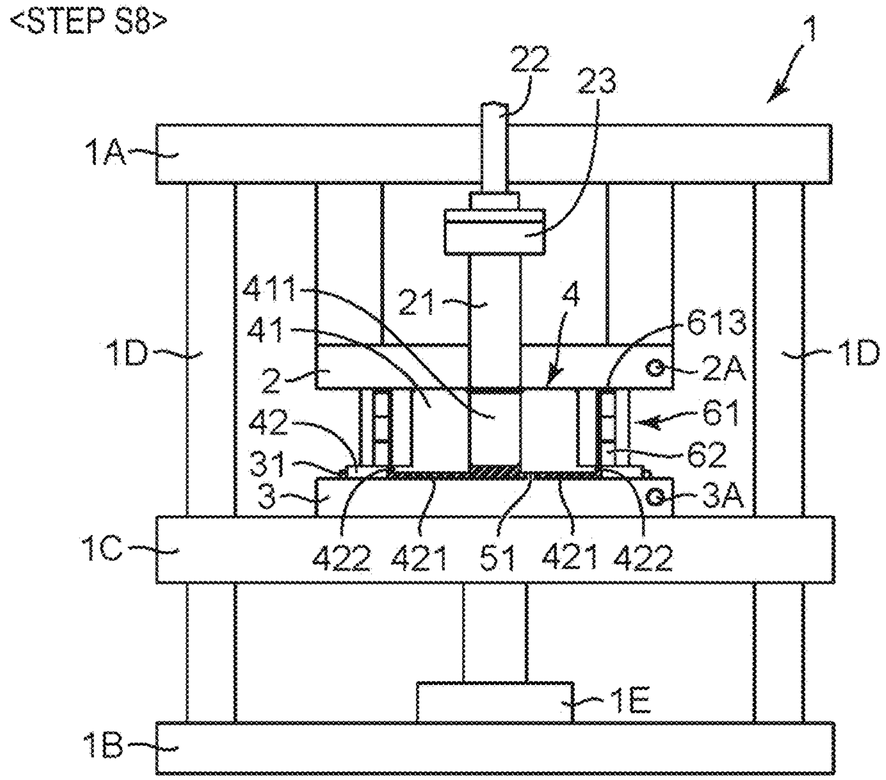
Figure 10:
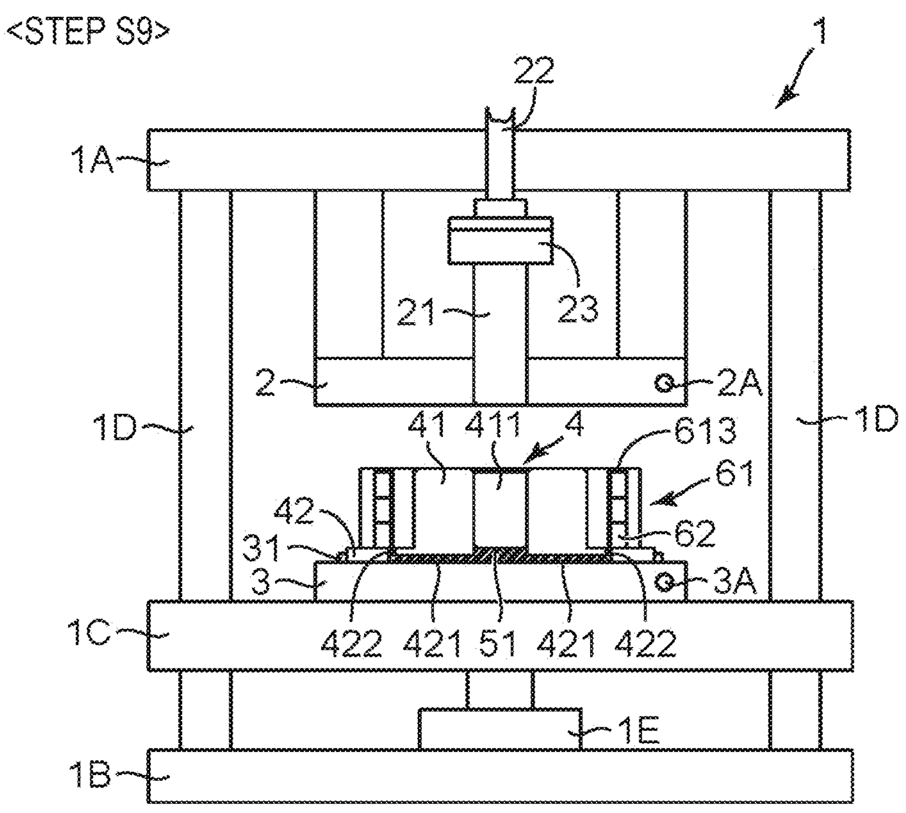
FIG. 10 includes views schematically illustrating processing in step S9 and step S10 of the manufacturing method for the laminated core.
Figure 10:
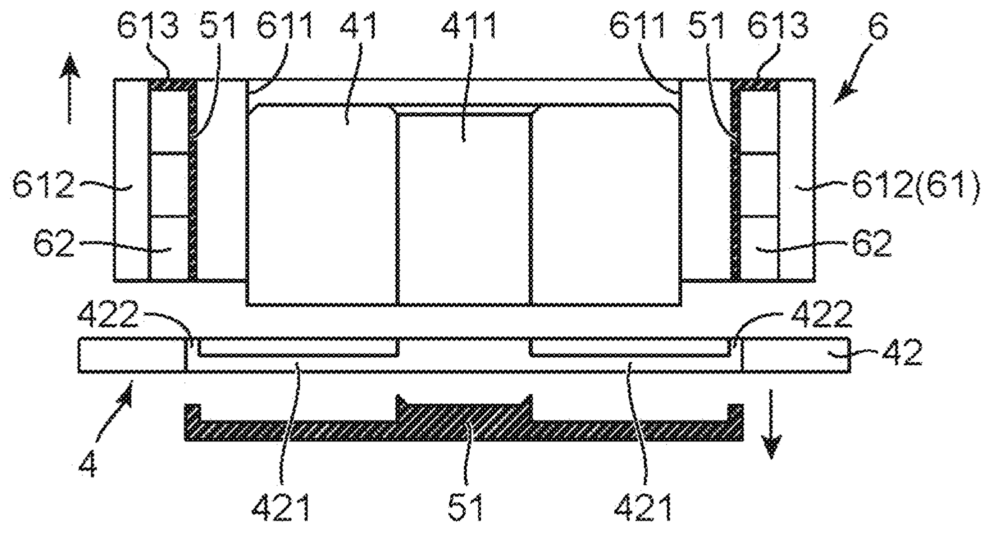

A manufacturing method for the laminated core 6 can be executed by using the manufacturing device 1 described above. A description will be made on the manufacturing method for the laminated core 6 with reference to a flowchart in FIG. 5 as well as FIGS. 6 to 10, each of which schematically illustrates processing in respective steps. In the manufacturing method using the manufacturing device 1, the laminated core 6 is manufactured by executing processing in step S1 to step S10.

In step S1, the tray 4, which includes the cylindrical section 41 having the resin arrangement hole 411 and the brim section 42 having the plurality of resin flow path grooves 421 and the plurality of gates 422, is prepared. In step S2, the cylindrical section 41 is inserted in the shaft hole 611, and the brim section 42 is brought into contact with the outer circumferential portion 612 from below. The laminated core body 61 is thereby mounted on the tray 4. Thereafter, the magnet pieces 62 are inserted in the plurality of magnet insertion holes 613.

Next, in step S3, the tray 4, on which the laminated core body 61 is mounted, is placed on the lower plate 3. In step S4, the resin tablet 5, which is a molded body of the resin 51, is arranged in the resin arrangement hole 411.

Next, in step S5, the lower plate 3 is moved upward along with the upward movement of the lifting plate 1C, and the lower plate 3 is stopped before the upper plate 2 comes into contact with the laminated core body 61. In this state, the plunger 21 is lowered, and the plunger 21 is inserted in the resin arrangement hole 411 from above. In this way, the tray 4 can be accurately positioned with respect to the plunger 21 by positioning a center of the resin arrangement hole 411 on a center axis of the plunger 21.

Next, in step S6, the lower plate 3 is moved upward along with the upward movement of the lifting plate 1C, and the upper plate 2 is thereby brought into contact with the laminated core body 61, which is mounted on the tray 4 on the lower plate 3, from above.

Next, in step S7, the plunger 21, which has been inserted in the resin arrangement hole 411 from above, is lowered to press the resin tablet 5. In this way, each of the magnet insertion holes 613 can be filled with the resin 51 in the fluid molten state, which has been extruded from the resin arrangement hole 411 through the respective resin flow path groove 421 and the respective gate 422 of the tray 4. Furthermore, the resin 51 is thermally cured in each of the magnet insertion holes 613 and can thereby fix each magnet piece 62 in a respective magnet insertion hole 613.

After the resin 51, which has filled each of the magnet insertion holes 613, is thermally cured, in step S8, the plunger 21 is lifted until it exits the resin arrangement hole 411. Thereafter, in step S9, the lower plate 3 is moved downward along with the downward movement of the lifting plate 1C, and the contact between the upper plate 2 and the laminated core body 61, which is mounted on the tray 4 on the lower plate 3, is thereby canceled. In this case, the tray 4, on which the laminated core body 61 is mounted, remains placed on the lower plate 3, and the resin 51, which is cured in each of the magnet insertion holes 613, is separated from the upper plate 2. In this way, it is possible to prevent the cured product of the resin 51 from remaining on the upper plate 2.

The tray 4 in the state where the laminated core body 61 is mounted thereon is moved from the lower plate 3 to another workbench. Then, in step S10, the laminated core body 61 is separated from the tray 4. In this way, it is possible to obtain a laminated core 6 in which the magnet pieces 62 are fixed to respective magnet insertion holes 613 of the laminated core body 61.

When the laminated core body 61 is separated from the tray 4, the resin 51, which has been cured in each of the magnet insertion holes 613, is broken in the portion of the respective gate 422 of the tray 4. In this case, the cured product of the resin 51 remains in each of the resin flow path grooves 421 and each of the gates 422 of the tray 4. Thus, it is only necessary to perform the work to remove the cured product of the resin 51 from the tray 4. At this time, by removing the brim section 42 from the cylindrical section 41, it is possible to efficiently perform the removal work of the cured product of the resin 51 that remains in each of the resin flow path grooves 421 and each of the gates 422 formed in the brim section 42.

[Modified Embodiment]

The description has been made so far on the embodiment of the invention. However, the invention is not limited thereto, and a modified embodiment as will be described below may be implemented, for example.

Figure 11:
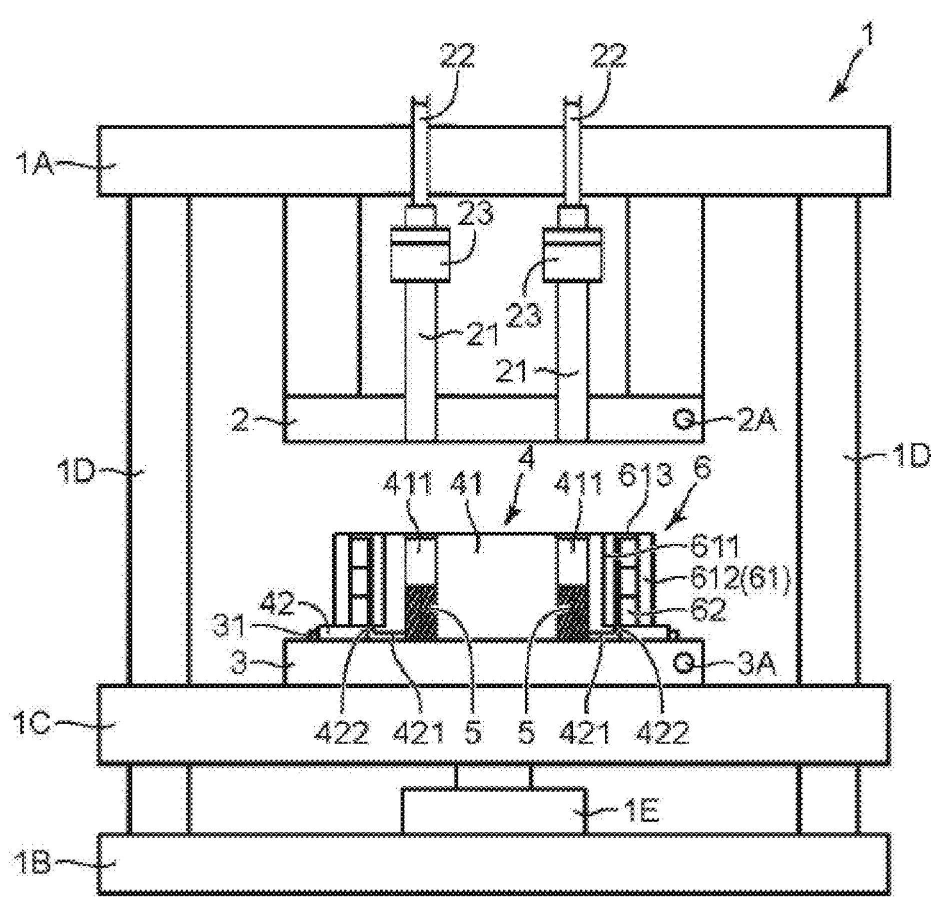
FIG. 11 is a view schematically illustrating a manufacturing device of a laminated core according to a modified embodiment.

In the above embodiment, the description has been made on the manufacturing device 1 in which the single plunger 21 is mounted on the upper plate 2 and which includes the tray 4 formed with the resin arrangement hole 411 along the center axis of the cylindrical section 41. However, the configuration of the manufacturing device 1 is not limited to such a configuration. As illustrated in FIG. 11, the manufacturing device 1 may have a structure in which the plurality of plungers 21 are mounted on the upper plate 2 and which includes the tray 4 having the cylindrical section 41 formed with the same number of the resin arrangement holes 411 as the plungers 21.

In this case, in the brim section 42 of the tray 4, the plurality of resin flow path grooves 421 extend radially away from each of the plurality of resin arrangement holes 411 respectively, and the gate 422 extends upward from the tip of each of the resin flow path grooves 421. At this time, the resin flow path grooves 421, each of which extends from the respective resin arrangement hole 411, preferably has substantially the same length.

In the manufacturing device 1, which is configured as described above, according to the modified embodiment, in the state where the upper plate 2 is in contact with the laminated core body 61 from above, each of the plungers 21 presses the resin tablet 5 in the resin arrangement hole 411 while being lowered. In this way, each of the magnet insertion holes 613 can be filled with the resin 51, which has been extruded from each of the resin arrangement holes 411, through the respective resin flow path groove 421 and the respective gate 422.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST

1: manufacturing device
2: upper plate
2A: heating section
21: plunger
3: lower plate
3A: heating section
4: tray
41: cylindrical section
411: resin arrangement hole
42: brim section
421: resin flow path groove
422: gate
5: resin tablet
51: resin
6: laminated core
61: laminated core body
611: shaft hole
612: outer circumferential portion
613: magnet insertion hole
62: magnet pieces

The invention claimed is:

1. A manufacturing device for a laminated core including: a laminated core body that has a shaft hole at a center and has a plurality of magnet insertion holes provided at intervals in a circumferential direction in an outer circumferential portion surrounding the shaft hole; and a plurality of magnet pieces, each magnet piece being fixed by resin and inserted in a respective one of the plurality of magnet insertion holes, the manufacturing device for the laminated core comprising:

an upper plate on which a vertically movable plunger is mounted;

a lower plate arranged under the upper plate; and a tray, on which the laminated core body, with the magnet pieces inserted in the respective magnet insertion holes, is mounted, and which is placed on the lower plate, wherein the upper plate comes into contact with the laminated core body, which is mounted on the tray on the lower plate, from above, and the tray includes:

a cylindrical section that has a resin arrangement hole and is inserted in the shaft hole of the laminated core body, the resin arrangement hole being a hole extending vertically, a resin tablet as a molded body of the resin being arranged therein, and the plunger for pressing the resin tablet being inserted therein; and a brim section that protrudes radially outward from a lower end of the cylindrical section, comes into contact with the lower plate from above, and comes into contact with the outer circumferential portion of the laminated core body from below, the brim section having: a plurality of resin flow path grooves, each of which extends radially from the resin arrangement hole in a lower surface opposing the lower plate; and a plurality of gates, each of which extends upward from a tip of a respective one of the plurality of resin flow path grooves and communicates with a respective one of the plurality of magnet insertion holes.

2. The manufacturing device for the laminated core according to claim 1, wherein the resin arrangement hole extends along a center axis of the cylindrical section, and the plurality of resin flow path grooves extend substantially for a same length from the resin arrangement hole.

3. The manufacturing device for the laminated core according to claim 1, wherein the tray is a conveyance tray that is conveyed by the lower plate in a state where the laminated core body is mounted on the tray.

4. The manufacturing device for the laminated core according to claim 1, wherein the resin is a thermosetting resin, and the upper plate and the lower plate each have a heating section capable of increasing a temperature to a temperature at which the thermosetting resin is thermally cured.

5. A manufacturing method for a laminated core including: a laminated core body that has a shaft hole at a center and has a plurality of magnet insertion holes provided at intervals in a circumferential direction in an outer circumferential portion surrounding the shaft hole; and a plurality of magnet pieces, each of the magnet pieces being fixed by resin and inserted in a respective one of the plurality of magnet insertion holes, the manufacturing method for the laminated core comprising:

preparing a tray that includes a cylindrical section having a resin arrangement hole extending vertically and a brim section protruding radially outward from a lower end of the cylindrical section and in which the brim section is formed with a plurality of resin flow path grooves extending radially from the resin arrangement hole and a plurality of gates, each of which extends upward from a tip of a respective one of the plurality of resin flow path grooves;

mounting the laminated core body on the tray by inserting the cylindrical section in the shaft hole and bringing the brim section into contact with the outer circumferential portion from below, and thereafter inserting the magnet pieces in the respective magnet insertion holes;

placing the tray, on which the laminated core body is mounted, on a lower plate arranged under an upper plate, on which a vertically movable plunger is mounted, and arranging a resin tablet, which is a molded body of the resin, in the resin arrangement hole; and bringing the upper plate into contact with the laminated core body, which is mounted on the tray on the lower plate, from above in a state where the plunger is inserted in the resin arrangement hole, and thereafter filling the plurality of magnet insertion holes with the resin, which is extruded from the resin arrangement hole by lowering the plunger and pressing the resin tablet through the plurality of resin flow path grooves and the plurality of gates.

6. The manufacturing method for the laminated core according to claim 5, in which the resin is a thermosetting resin, the manufacturing method for the laminated core further comprising:

lifting the plunger until the resin, which has filled the plurality of magnet insertion holes, exits the resin arrangement hole after the resin is thermally cured, canceling contact between the upper plate and the laminated core body, and thereafter separating the laminated core body from the tray.

* * * * *